United States Patent
Bostanci et al.

(10) Patent No.: US 8,806,192 B2
(45) Date of Patent: Aug. 12, 2014

(54) PROTECTED AUTHORIZATION FOR UNTRUSTED CLIENTS

(75) Inventors: Hakki Tunc Bostanci, Redmond, WA (US); Robert Edgar Fanfant, Mercer Island, WA (US); Chih-Pin Kao, Redmond, WA (US); Satish K. Shetty, Redmond, WA (US); Kalin G. Toshev, Redmond, WA (US); Yefei Gao, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 106 days.

(21) Appl. No.: 13/100,450

(22) Filed: May 4, 2011

(65) Prior Publication Data

US 2012/0284507 A1    Nov. 8, 2012

(51) Int. Cl.
*H04L 29/06* (2006.01)

(52) U.S. Cl.
USPC ......................................................... 713/155

(58) Field of Classification Search
USPC .................................. 713/150–201; 709/227
See application file for complete search history.

(56) References Cited

U.S. PATENT DOCUMENTS

| | | | |
|---|---|---|---|
| 5,164,988 A | 11/1992 | Matyas et al. | |
| 6,412,007 B1 | 6/2002 | Bui et al. | |
| 7,100,200 B2 | 8/2006 | Pope et al. | |
| 7,366,900 B2 | 4/2008 | Shambroom | |
| 7,395,549 B1 | 7/2008 | Perlman et al. | |
| 7,693,285 B2 | 4/2010 | Curry | |
| 2001/0032314 A1* | 10/2001 | Ansper et al. | 713/176 |
| 2002/0062452 A1* | 5/2002 | Ford | 713/201 |
| 2002/0112162 A1* | 8/2002 | Cocotis et al. | 713/176 |
| 2003/0005286 A1* | 1/2003 | McGarvey | 713/155 |
| 2003/0237004 A1* | 12/2003 | Okamura | 713/201 |
| 2004/0030887 A1* | 2/2004 | Harrisville-Wolff et al. | 713/155 |
| 2006/0064588 A1* | 3/2006 | Tidwell et al. | 713/169 |
| 2007/0168512 A1* | 7/2007 | Gupta et al. | 709/225 |
| 2009/0100261 A1* | 4/2009 | Aoshima | 713/155 |
| 2009/0132813 A1* | 5/2009 | Schibuk | 713/158 |

(Continued)

OTHER PUBLICATIONS

Ugur, et al., "A Framework for Licensed Digital Signatures", Retrieved at<<http://ieeexplore.ieee.org/stamp/stamp.jsp?tp=&arnumber=5383969>>, First International Conference on Networks & Communications, 2009, pp. 428-432.

(Continued)

*Primary Examiner* — Chau Le
*Assistant Examiner* — Don Zhao
(74) *Attorney, Agent, or Firm* — John Jardine; Andrew Sanders; Micky Minhas

(57) ABSTRACT

One or more techniques and/or systems are provided for securely authorizing a client to consume data and/or services from a service provider server while mitigating burdensome requests made to a validation server. That is, validation data provided to a client from a validation server may be maintained on the client and at least some of that validation data can be used to subsequently authorize the client when the client attempts to consume data and/or services from the service provider server (e.g., download a song). However, the validation data is maintained on the client and/or provided to the service provider server in a manner that inhibits user tampering. In this manner, numerous requests for validation of the client need not be made from the service provider server to the validation server when a client requests content from the service provider server, while also inhibiting unauthorized consumptions of data by the client.

20 Claims, 7 Drawing Sheets

(56) References Cited

U.S. PATENT DOCUMENTS

| | | |
|---|---|---|
| 2009/0158042 A1* | 6/2009 | Calhoun et al. ............... 713/171 |
| 2009/0235069 A1 | 9/2009 | Sonnega et al. |
| 2010/0161962 A1 | 6/2010 | Lim |
| 2011/0004763 A1* | 1/2011 | Sato et al. ..................... 713/175 |
| 2011/0047209 A1* | 2/2011 | Lindholm et al. ............ 709/203 |
| 2012/0096271 A1* | 4/2012 | Ramarathinam et al. ..... 713/172 |

OTHER PUBLICATIONS

Beck, et al., "Scalable, Trustworthy Network Computing Using Untrusted Intermediaries", Retrieved at <<http://netlib.org/utk/people/JackDongarra/PAPERS/position-trustworthy.pdf>>, Retrieved Date: Dec. 28, 2010, pp. 5.

* cited by examiner

PROTECTED AUTHORIZATION FOR UNTRUSTED CLIENTS

BACKGROUND

Today, many software applications are protected through licensing technology. A software license typically grants an end-user permission to use one or more copies of a software application. The software license may be implemented to mitigate instances of the end-user utilizing unauthorized copies of the software application. In one example, a software application may be bundled with a software license key that may be used to enable installation and operation of the software application. In another example, a licensing server may facilitate software licensing validation to enable operation of the software application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for authorizing a client are disclosed herein. Authorization of the client may provide for the secure transfer of licensing information between a validation server and another server via the client, which may be an untrusted client (e.g., not yet known to be authorized, validated, etc.). In particular, a client may request validation of a software application, such as a graphical user interface and/or an operating system, from a validation server. The validation server may be configured to determine whether the client is authorized to install and/or operate the software application. For example, the validation server may determine that a software license for the software application is genuine. Upon determining that the software license is genuine, the validation server may create a signed genuine ticket (e.g., a uniquely signed genuine ticket) signed by the validation server. To inhibit cloning of the genuine ticket, the genuine ticket may be unique in that the genuine ticket may be correlated with other data sources of the client, such as an IP address, MAC address, product ID, and/or other data of the client, for example. However, if the software license is not genuine, then the validation server may create a fake-genuine ticket (e.g., which may ultimately be used to track down a user attempting to utilize unauthorized versions of the software application). In addition to creating a genuine ticket or fake-genuine ticket, the validation server may issue a client key pairing, comprising a private key and public key. The private key, which may be encrypted, in one example, may be used by the client to sign a client signature. The public key may be used by other servers and/or entities to determine whether a client signature is valid. In one example, the client key pairing may be renewable so that the client key pairing may be revocable by the validation server. The validation server may send the encrypted private key and the signed genuine ticket (or the fake-genuine ticket) with the public key to the client. The client may maintain the encrypted private key and the signed genuine ticket with the public key based upon the validation of the client by the validation server.

The client may desire to consume data and/or services from a service provider server. It may be appreciated that a service provider server may be any computing device that provides data and/or services (e.g., a server configured to facilitate an application store, a database, a web service, a website, information repository, document provider, etc.). The client may receive an authorization request and a session ID from the service provider server (e.g., in response to requesting to consume data and/or services). The client may sign the session ID with a client signature using the private key and/or sign the session ID with a lockbox signature using a licensing service lockbox private key (e.g., a private key known to a client licensing component of the client, but not known to third parties, which may be used to establish to a service provider server that the client licensing component originated the signed genuine ticket within an authorization request, as opposed to a malicious third party, for example) to create a signed session ID. The client may incorporate a timestamp into the signed session ID.

The client may send to the service provider server an authorization response. The authorization response may comprise the signed genuine ticket with the public key incorporated into the signed genuine ticket and/or the authorization response may comprise the signed session ID. The service provider server may authorize the client by authorizing the client signature using the public key. The service provider may authorize the client by authorizing the lockbox signature using a licensing service lockbox public key corresponding to the licensing service lockbox private key. The service provider server may authorize the client by determining if the signed session ID corresponds to the session ID initially sent to the client in the authorization request. The service provider server may authorize the client by determining the validity of the validation server's signature within the signed genuine ticket.

The client may receive an authorization from the service provider server based upon the service provider server authorizing at least one of the client signature, the lockbox signature, the signed session ID, and/or the signed genuine ticket. In this way, the client may be authorized to interact with the service provider server because the service provider server has verified the trustworthiness and security of the client. It may be appreciated that licensing information may be associated with the authorization request. In one example, the licensing information may correspond to a software application validated by the validation server. In another example, the licensing information may correspond to data and/or services provided by the service provider server. For example, the client may consume a software application provided by an application store hosted by the service provider server based upon the authorization and/or the licensing information. In this way, the service provider server may consume secure licensing information stored on an untrusted client without overloading a validation server with repeated validation requests for such licensing information.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
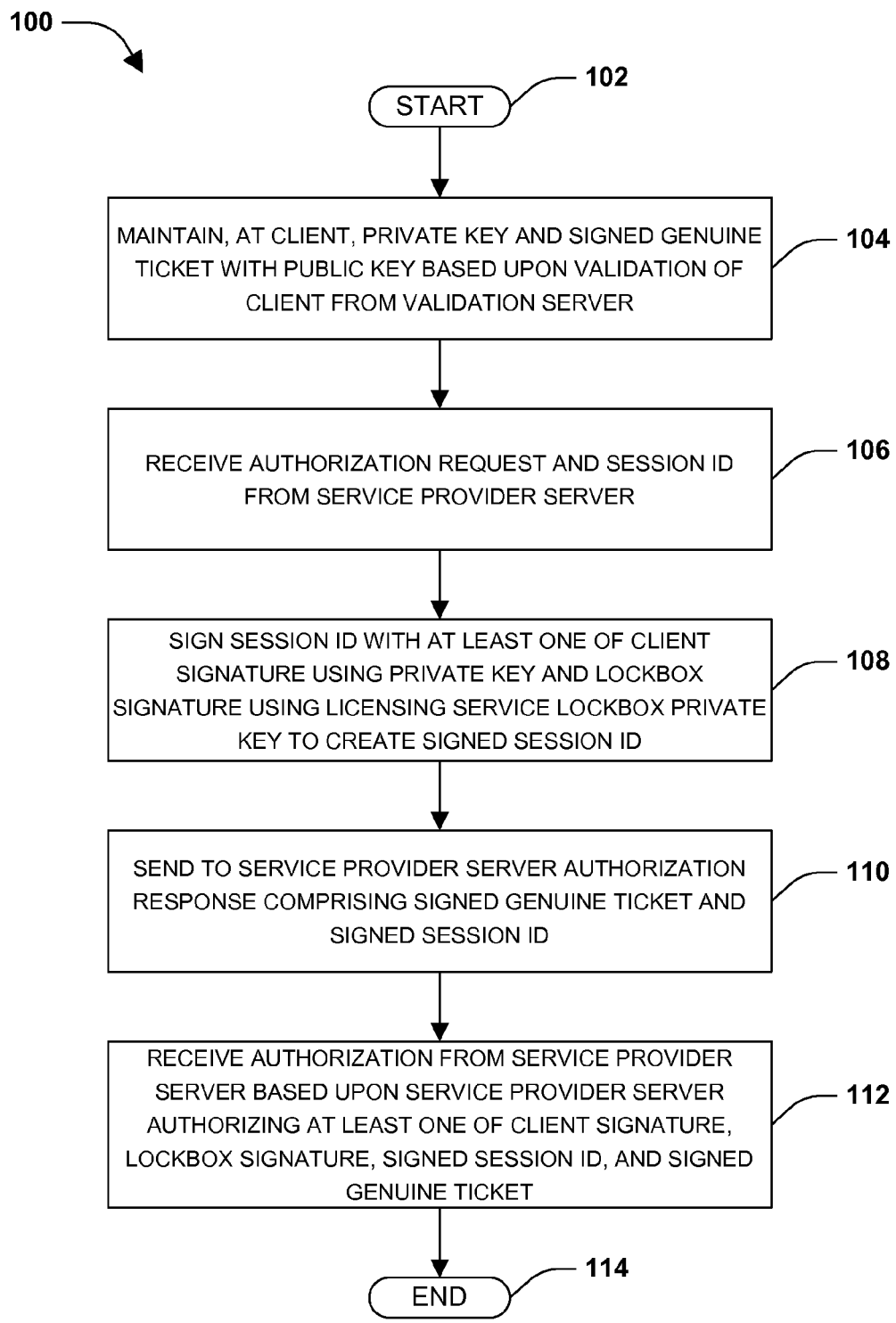
FIG. 1 is a flow chart illustrating an exemplary method of authorizing a client.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Licensing technology is a common technique for protecting software applications from misuse. Licensing technology may restrict an end-user's use of a software application as specified by a software license. For example, a software license may limit the end-user to a specific number of copies of the software application and/or restrict the end-user to particular features of the software application. Unfortunately, repeated validation requests to a validation server to check licensing information may be cumbersome. However, storing the licensing information on a client may provide opportunities for the client to tamper with the licensing information.

Accordingly, one or more systems and/or techniques for authorizing a client are provided herein. In one example, a client may be authorized by a service provider server based upon authenticating session information between the client and the service provider server, a genuine ticket comprising a signature of a validation server, a client signature signed by the client using a private key, and/or a lockbox signature signed by the client using a licensing lockbox private key. For example, a validation server may provide a client with a private key and public key pairing and a signed genuine ticket. The client may encrypt and store the private key in a protected location. The client may store the signed genuine ticket with the public key incorporated into the signed genuine ticket. When interacting with (e.g., requesting data and/or services from) a service provider server, the client may receive an authorization request and a session ID. The client may sign the session ID with a client signature using the private key and/or sign the session ID with a lockbox signature using a licensing service lockbox private key to create a signed session ID. The client may provide an authorization response comprising the signed session ID and/or the signed genuine ticket comprising the public key. In this way, the service provider server may consider the client as being authorized. In particular, the service provider server may consider licensing information from the client as being secured and trustworthy, even though the client may be untrusted (e.g., even though the client is not known, trusted, etc. the service provider server may determine that the client did not alter licensing information). The server provider server may provide data and/or services to the client based upon licensing information stored at the client, without requesting such licensing information from a validation server.

One embodiment of authorizing a client is illustrated by an exemplary method 100 in FIG. 1. At 102, the method starts. At 104, a private key and a signed genuine ticket with a public key may be maintained at a client based upon validation of the client from a validation server. In one example, the client may have received a private and public key pairing and the signed genuine ticket from a validation server in response to a request from the client for validation (e.g., validation for installation of a software application and/or operating system on the client). The validation server may have issued and signed the signed genuine ticket based upon validating the client as genuine (e.g., a product ID of an operating system may be determined as genuine). It may be appreciated that the validation server may issue and return to the client a fake-genuine ticket if the client is not validated (e.g., a validation denial may result due to an invalid product ID). Additionally, the validation server may have issued the private key and the public key based upon validating the client as genuine. The private key may allow the client to sign a client signature on messages, such as requests to other servers. The public key may allow other servers or entities to authenticate the client signature. In one example, the client may maintain the signed genuine ticket with the public key, so that the client may send the signed genuine ticket with the public key to other entities for validating the client's signature using the public key. In one example, the client may encrypt the private key, and store the private key in a protected location on the client. The client may cache the signed genuine ticket with the public key on the client. The signed genuine ticket may offer proof that the client is genuine, even though the client may be untrusted by other entities. It may be appreciated that the client may also maintain licensing information received from the validation server based upon the validation server validating the client as genuine.

At 106, an authorization request and session ID may be received from a service provider server. It may be appreciated that the service provider server may be any type of computing device that provides data and/or services, such as a web server, a data server, an application server, etc. In one example, the authorization request and session ID may be received based upon the client requesting data and/or a service from the service provider server (e.g., the client may request a software application from an application store hosted by the service provider server).

At 108, the session ID may be signed with at least one of a client signature, a lockbox signature, a timestamp, and/or other validation credentials to create a signed session ID. The session ID may be signed with the client signature using the private key. The session ID may be signed with the lockbox signature using a licensing service lockbox private key. At 110, an authorization response comprising the signed session ID and the signed genuine ticket with public key may be sent to the service provider server. The authorization response may comprise the signed session ID to mitigate tunneling and/or exposure to attacks. The session ID may, for example, comprise personal information to mitigate sharing (e.g., by the signed genuine ticket) of the session ID with third parties.

At 112, an authorization may be received from the service provider server based upon the service provider server authorizing at least one of the client signature, the lockbox signature, the signed session ID, and the signed genuine ticket. In one example, service provider server may have authorized the client signature using the public key within the signed genuine ticket. It may be appreciated that the private key and public key may be a renewable key pair that enables the option for revocation. In this way, the client may receive an authorization denial based upon the service provider failing to validate the client signature due to a revocation of the public key associated with the client signature. In another example, the service provider server may have authorized the lockbox signature using a licensing service lockbox public key associated with the licensing service lockbox private key used to sign the lockbox signature. That is, the service provider server may validate the lockbox signature to determine that a client licensing component of the client, as opposed to a malicious third party, for example, originated the signed genuine ticket. In another example, the service provider server may have authorized the signed session ID by comparing the session ID originally created by the service provider server (e.g., the session ID originally received by the client) with the session ID from the signed genuine ticket. In another example, the service provider server may have authorized the signed genuine ticket based upon a signature of the validation server.

Upon receiving the authorization, the client may interact with the service provider server as an authorized client even though the client may be an untrusted client. In one example, the client may send licensing information to the service provider server. In one example, the licensing information may correspond to a software application, such as an operating system of the client, validated by the validation server. In another example, the licensing information may correspond to data and/or services provided by the service provider server. For example, the licensing information may authorize the user to consume a software application provided by an application store hosted by the service provider server based upon the authorization and/or the licensing information (e.g., the authorized client may download the software application at a discount or free, which may otherwise cost additional money for an unauthorized client). In this way, secure licensing information may be transmitted from the validation server to the service provider server through the client, which may be an untrusted client, with a high degree of certainty that the licensing information has not been modified by the client. Additionally, the service provider server may authorize the client without placing a burden upon the validation server with repeated validation requests (e.g., and thereby reducing bandwidth and/or other resource utilization as well).

It may be appreciated that the client may have initially received a fake-genuine ticket from the validation server. That is, the validation server may have determined that the client is not genuine (e.g., the client may be operating a pirated or authorized duplicate copy of an operating system and/or software application). In this way, the validation server may return a fake-genuine ticket in place of the signed genuine ticket. The client may or may not be aware of the difference between the issuance of a signed genuine ticket and a fake-genuine ticket. Thus, the client may maintain the fake-genuine ticket as though a signed genuine ticket was returned by the validation server. When the client attempts to interact with the service provider server, the client may send a fake authorization response comprising the fake-genuine ticket and the signed session ID. It may be appreciated that the client may be unaware that the client is sending a fake authorization response with the fake-genuine ticket, as opposed to an authorization response with a signed genuine ticket. The client may receive an authorization denial based upon the service provider server receiving the fake-genuine ticket (e.g., the service provider server may determine that the fake-genuine ticket indicates that the client is not genuine). In one example, the client may be unaware of the authorization denial, but the service provider server may merely treat licensing information from the client with suspicion. In another example, the service provider server may deny licensing information from the client. It may be appreciated that the authorization denial may be implemented in a variety of ways (e.g., identifying the client/user attempting to pirate software). At 114, the method ends.

Figure 2:
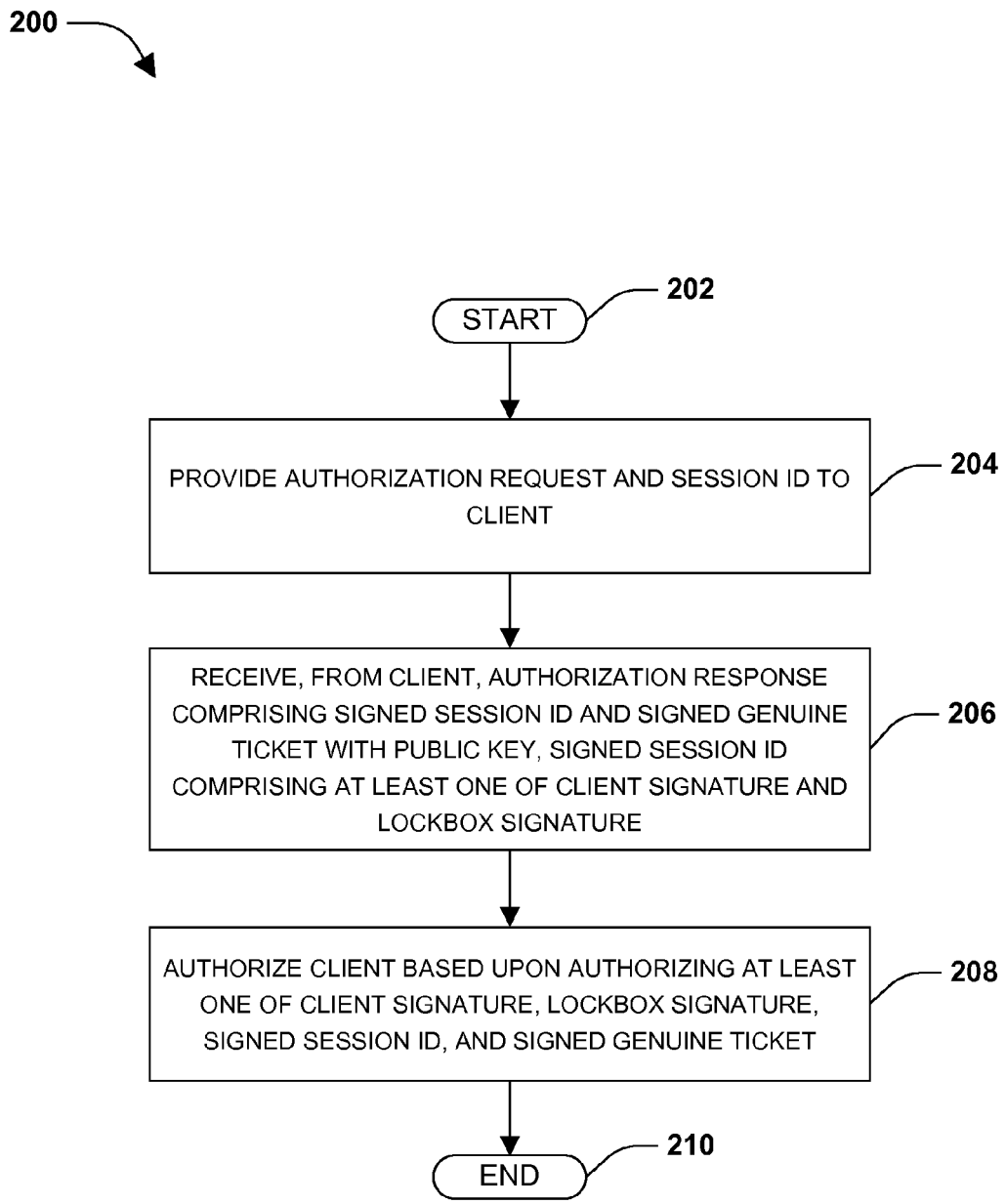
FIG. 2 is a flow chart illustrating an exemplary method of authorizing a client.

One embodiment of authorizing a client is illustrated by an exemplary method 200 in FIG. 2. At 202, the method begins. At 204, an authorization request and a session ID may be provided to a client. For example, a service provider server may receive a request from the client to interact with data and/or services of the service provider server (e.g., the client may desire to consume data and/or a software application from the service provider based upon licensing information of/from the client). In response to the request from the client, the service provider sever may send the authorization request and the session ID to the client.

At 206, an authorization response may be received from the client. The authorization response may comprise a signed session ID comprising a client signature, a lockbox signature, and/or other client credentials. The authorization response may comprise a signed genuine ticket with a public key. At 208, the client may be authorized based upon authorizing at least one of the client signature, the lockbox signature, the signed session ID, and/or the signed genuine ticket. In one example, the client signature may be authorized using the public key within the signed genuine ticket. In another example, the lockbox signature may be authorized using the public key within the signed genuine ticket. Upon authorizing the client, licensing information may be consumed from the client. The authorization may indicate that the licensing information has not been tampered with by the client even though the client may be untrusted. In this way, data and/or services may be provided to the client based upon the licensing information (e.g., a software application may be made available to the client for free). At 210, the method ends.

Figure 3:
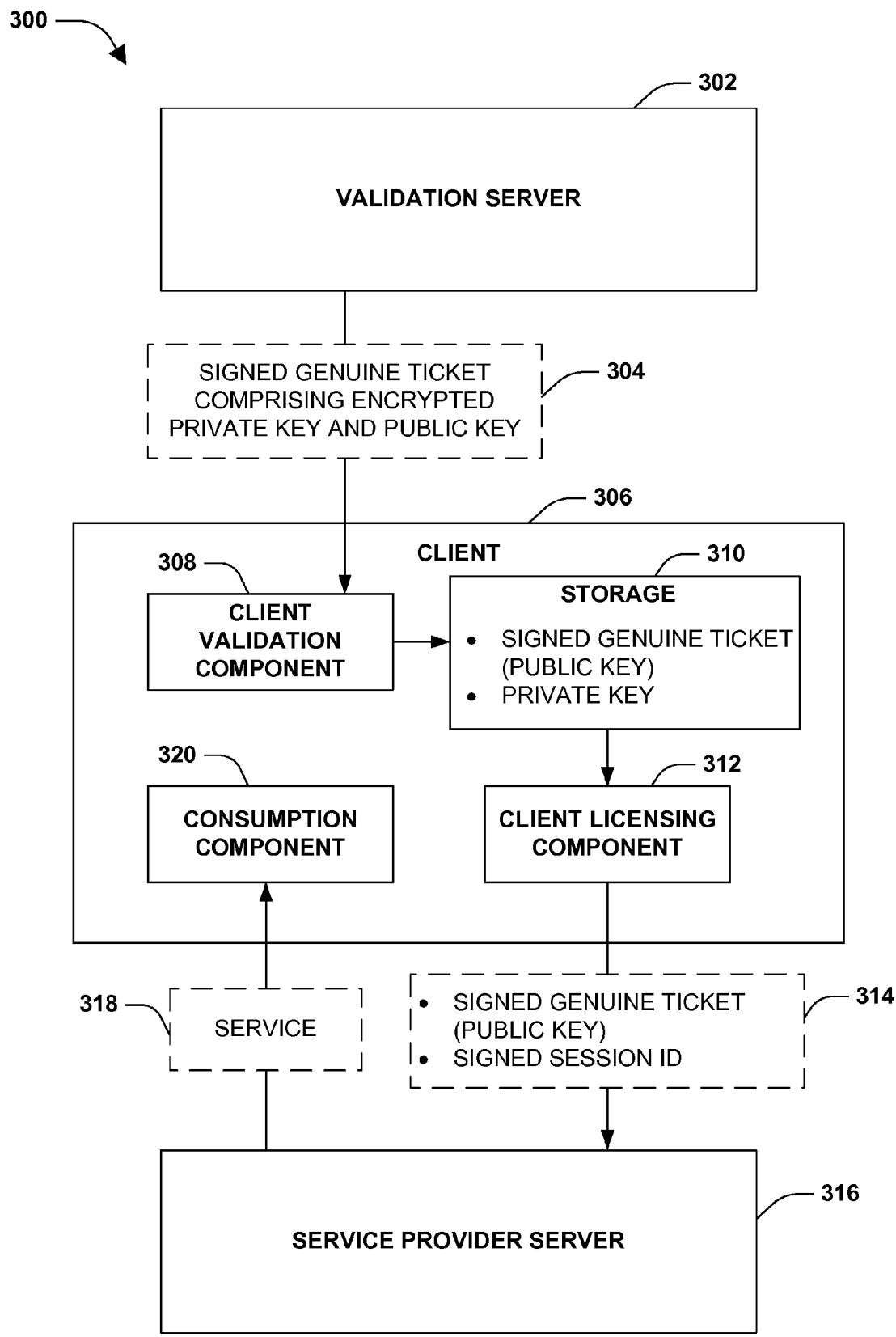
FIG. 3 is a component block diagram illustrating an exemplary system for authorizing a client.

FIG. 3 illustrates an example of a system 300 configured for authorizing a client 306. The client 306 may be associated with a client validation component 308, a client licensing component 312, and/or a consumption component 320. The client validation component 308 may be configured to maintain a private key and a signed genuine ticket with a public key, such as in storage 310, based upon validation of the client 306 by a validation server 302. For example, the client 306 may request validation from the validation server 302 (e.g., the client 306 may issue a request to the validation server 302 to validate the genuineness of a software application and/or an operating system of the client 306). If the validation server 302 determines that the client 306 is genuine (e.g., the client 306 has a valid product ID for an operating system of the client 306), then the validation server 302 may send 304 a private key and/or a signed genuine ticket comprising a public key to the client 306. However, if the validation server 302 determines that the client 306 is not genuine, then the validation server 302 may return a fake-genuine ticket in place of the signed genuine ticket. In such a scenario, the client validation component 308 may maintain the fake-genuine ticket as if it were a signed-genuine ticket (e.g., providing a means for tracking down a user attempting to use an unauthorized (e.g., stolen) version of the software application).

The client licensing component 312 may be configured to receive an authorization request and a session ID from a service provider server 316. In one example, the consumption component 320 may have requested authorization to interact with a service 318 (e.g., the client 306 may desire to consume data and/or services from the service provider server 316 based upon licensing information of/from the client 306). However, the client 306 may be an untrusted client. Thus, the service provider server 316 may send the authorization request and session ID to the client 306 in order to request additional information from the client 306 for authorization.

The client licensing component 312 may be configured to sign the session ID with at least one of a client signature using the private key and a lockbox signature using a licensing service lockbox private key to create a signed session ID. The client licensing component 312 may send the service provider server 316 an authorization response 314 comprising the signed session ID and/or the signed genuine ticket with public key. The client licensing component 312 may receive an authorization from the service provider server 316 based upon the service provider server authorizing at least one of the client signature, the lockbox signature, the signed session ID, and/or the signed genuine ticket. In one example, the authorization may be based upon the service provider server 316 authorizing the client signature and/or the lockbox signature using the public key within the signed genuine ticket. In another example, the authorization may be based upon the service provider server 316 determining that the signed session ID corresponds to the session ID provided by the service provider server 316 to the client 306 within the authorization request. In another example, the authorization may be based upon the service provider server 316 determining that the signed genuine ticket has a genuine signature of the validation server 302. In this way, the client may be authorized to interact with the service provider server 316. For example, the consumption component 320 may send licensing information to the server provider server 316 (e.g., where the licensing information is now deemed not to have been tampered with by the client and/or a user thereof). The consumption component 320 may consume data and/or a service 318 associated with the licensing information. It may be appreciated that the consumption component 320 may be authorized to interact with and/or consume a plethora of different services hosted by the service provider server 316. In one example, the consumption component 320 may download a software application from an application store hosted by the service provider server 316. In another example, the consumption component 320 may consume weather information from a weather web service hosted by the service provider server 316.

Figure 4:
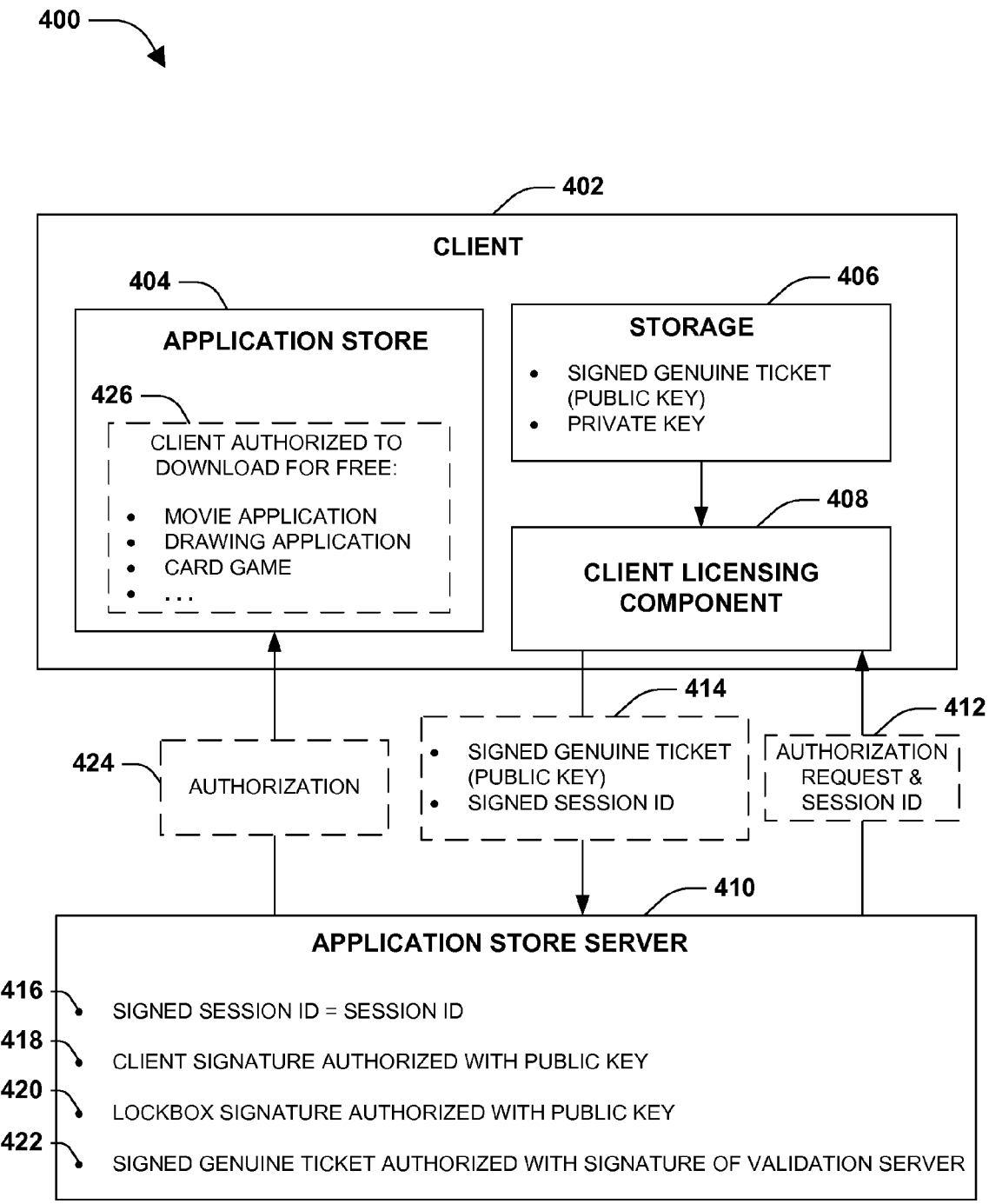
FIG. 4 is an illustration of an example of a client receiving authorization to consume one or more applications from an application store hosted by an application store server.

FIG. 4 illustrates an example 400 of a client 402 receiving authorization to consume one or more applications from an application store 404 hosted by an application store server 410. The client 402 may be associated with validation information previously received from a validation server. For example, the client may have attempted to setup an operating system. During setup of the operating system, the client 402 may have validated the genuineness of the operating system with a validation server using a product ID. It may be appreciated that a product ID or a product key may be part of any one or more components used to verify the genuineness of the client. The client 402 may have received a private and public key pairing and a signed genuine ticket from the validation server. The client 402 may maintain the private key and the signed genuine ticket with the public key (e.g., storage 406). The client 402 may interact with the application store 404 hosted by the application store server 410 (e.g., the client may navigate to a web page associated with the application store 404; the client may execute an application associated with the application store 404; etc.). The application store server 410 may provide the client 402 with differing levels of access based upon licensing information of the client 402 (e.g., the application store server 410 may allow the client 402 to download a particular application for free based upon a particular software license held by the client 402). However, before the application store server 410 accepts the licensing information from the client 402, the application store server 410 may request authorization information from the client 402. In this way, the application store server 410 may determine that the client 402 is genuine and/or that the licensing information has not been tampered with by the client 402. Therefore, the application store server 410 may receive secure licensing information from the client 402 even though the client 402 may be untrusted.

In one example, a client licensing component 408 may receive an authorization request and session ID 412 from the application store server 410. The client licensing component 408 may sign the session ID with at least one of a client signature, a lockbox signature, and a timestamp to create a signed session ID. The client licensing component 408 may send an authorization response 414 comprising the signed session ID and the signed genuine ticket with the public key to the application store server 410. The client 402 may receive authorization 424 based upon the application store server 410 authorizing at least one of the signed session ID 416, the client signature 418, the lockbox signature 420, and the signed genuine ticket 422. In this way, the application store server 410 may accept and/or treat licensing information from the authorized client 402 as being secure (e.g., the application store server 410 may determine that the authorized client 402 has not altered licensing information). Thus, the client 402 may interact with the application store 404 as specified by the licensing information. For example, the client 402 may be authorized to download 426 certain applications, such as card games, drawing applications, and movie applications, for free based upon the licensing information sent from the client 402 to the application store server 410.

Figure 5:
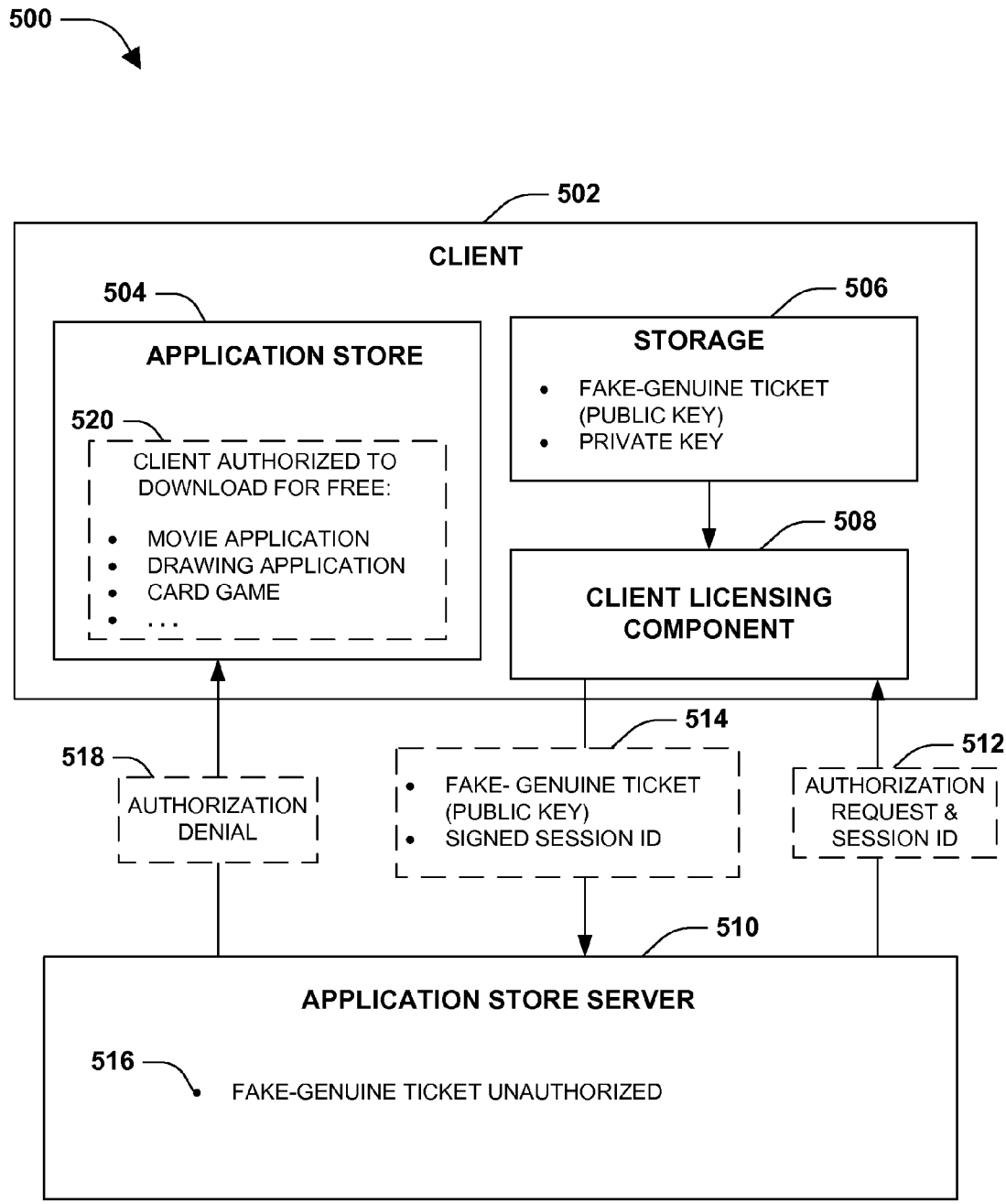
FIG. 5 is an illustration of an example of a client receiving an authorization denial from an application store server.

FIG. 5 illustrates an example 500 of a client 502 receiving an authorization denial 518 from an application store server 510. The client 502 may be associated with validation information previously received from a validation server. For example, the client 502 may have attempted to setup an operating system. During setup of the operating system, the client 502 may have requested validation from a validation server. However, the validation server may have determined that the operating system is not genuine (e.g., a product key associated with the operating system may not be genuine for the particular setup of the operating system). Thus, the client 502 may receive a private and public key pairing and a fake-genuine ticket. In this way, the client 502 may maintain the private key and the fake-genuine ticket with public key (e.g., storage 506).

The client 502 may interact with an application store 504 hosted by the application store server 510. The application store server 510 may provide the client 502 with differing levels of access based upon licensing information of the client 502. However, before the application store server 510 accepts the licensing information from the client 502, the application store server 510 may request authorization information from the client 502.

In one example, a client licensing component 508 may receive an authorization request and session ID 512 from the application store server 510. The client licensing component 508 may sign the session ID with at least one of a client signature, a lockbox signature, and a timestamp to create a signed session ID. The client licensing component 508 may send a fake-authorization response 514 comprising the signed session ID and the fake-genuine ticket with the public key to the application store server 510. It may be appreciated that the client 502 may be unaware that the fake-genuine ticket is not a signed genuine ticket, and thus the client 502 may be unaware that the fake-authorization response 514 is not an authorization response with a signed genuine ticket. The client 502 may receive the authorization denial 518 based upon the application store server 510 determining 516 that the fake-genuine ticket is not genuine. In this way, the application store server 510 may treat licensing information from the client 502 as suspect. In one example, the application store server 510 may determine that the client 502 may have tampered with the licensing information, and may thus reject the licensing information. In another example, the application store server 510 may accept the licensing information, but may provide the client with reduced access to the application store 504. For example, the client 502 may have to pay to download 520 applications from the application store 504, as opposed to having free access to the applications based upon proper authorization.

Figure 6:
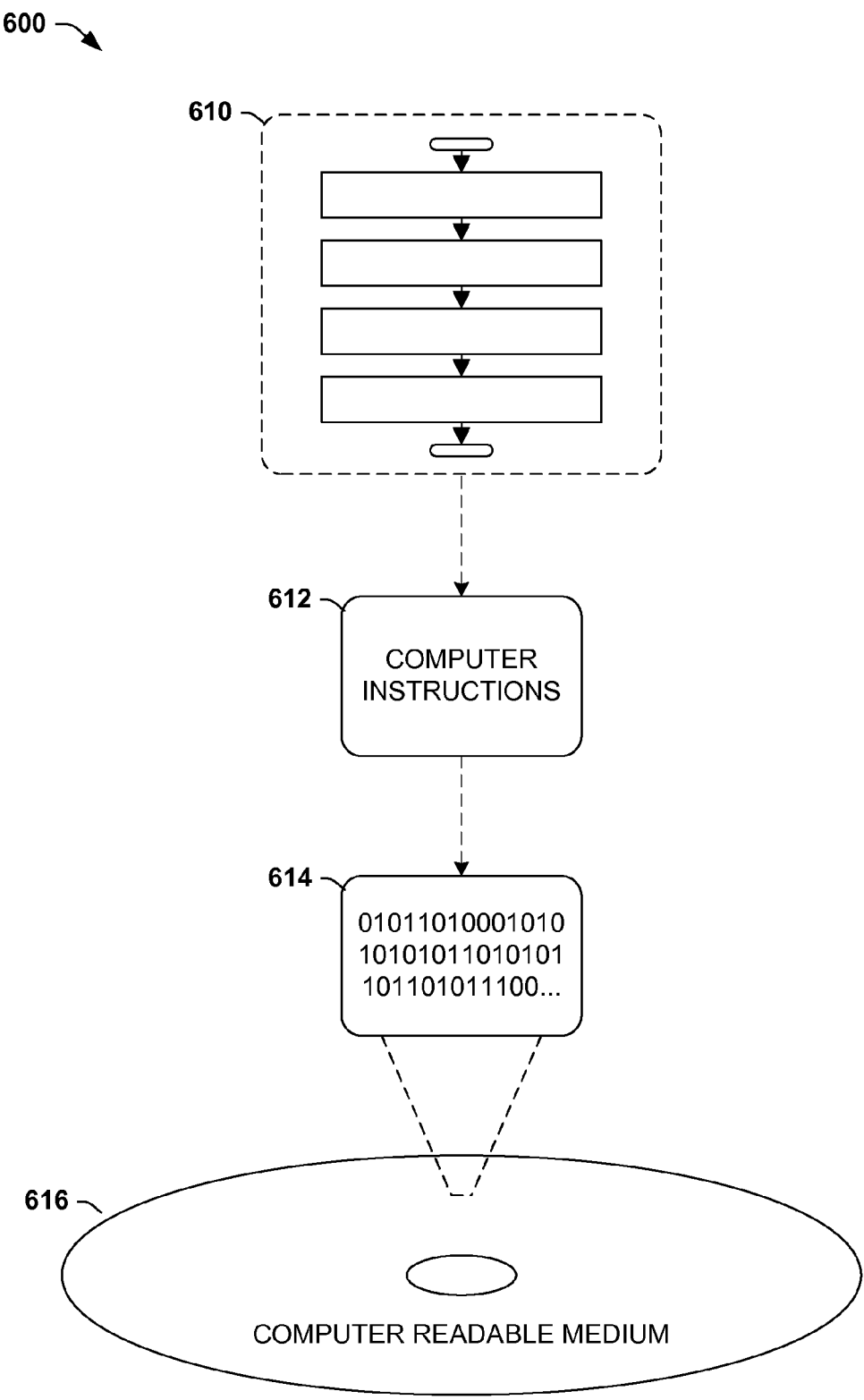
FIG. 6 is an illustration of an exemplary computer-readable medium wherein processor-executable instructions configured to embody one or more of the provisions set forth herein may be comprised.
Figure 7:
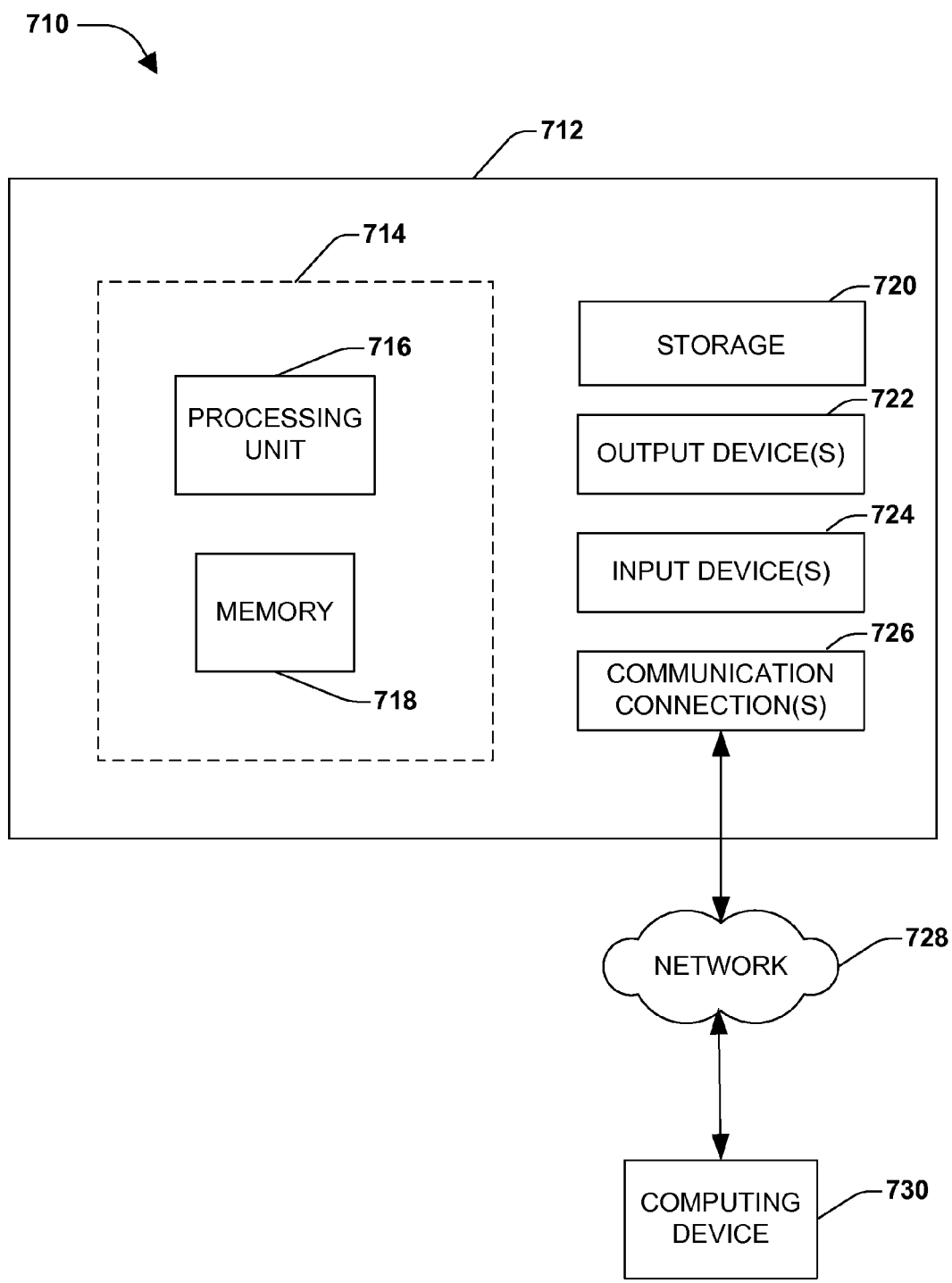
FIG. 7 illustrates an exemplary computing environment wherein one or more of the provisions set forth herein may be implemented.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as the exemplary method 100 of FIG. 1 and/or exemplary method 200 of FIG. 2, for example. In another such embodiment, the processor-executable instructions 612 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

It may be appreciated that at least one of A and B and/or the like generally means A or B or both A and B.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Additionally, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:

responsive to sending a request to validate a client to a validation server, receiving a signed genuine ticket based upon validation of the client from the validation server, the signed genuine ticket comprising a validation server signature of the validation server but not a signature of the client, the validation server signature indicating that the validation server validated the client;

responsive to sending a request to consume data or one or more services to a service provider server, receiving a session ID from the service provider server, the service provider server different than the validation server, the client different than the service provider server and the validation server;

signing the session ID with at least one of a client signature using a private key or a lockbox signature using a licensing service lockbox private key to create a signed session ID;

sending to the service provider server an authorization response comprising the signed genuine ticket and the signed session ID;

receiving an authorization from the service provider server based upon the service provider server authorizing at least one of the client signature, the lockbox signature, the signed session ID, or the signed genuine ticket;

responsive to sending a second request to consume data or one or more services to the service provider server, receiving a second session ID from the service provider server;

signing the second session ID to create a signed second session ID;
sending to the service provider server a second authorization response comprising the signed genuine ticket and the signed second session ID; and
receiving a second authorization from the service provider server.

2. The method of claim 1, comprising:
the signed genuine ticket corresponding to at least one of an IP address of the client, a MAC address of the client, or a product ID associated with the client.

3. The method of claim 1, comprising:
consuming a service provided by the service provider server based upon at least one of the authorization or licensing information associated with the client.

4. The method of claim 1, comprising:
maintaining a fake-genuine ticket based upon a validation denial of the client from the validation server.

5. The method of claim 4, comprising:
sending to the service provider server a fake authorization response comprising the fake-genuine ticket and the signed session ID; and
receiving an authorization denial based upon the service provider server receiving the fake-genuine ticket.

6. The method of claim 1, the receiving an authorization from the service provider server comprising:
receiving the authorization based upon the service provider server authorizing the client signature using a public key received from the validation server.

7. The method of claim 1, the receiving an authorization from the service provider server comprising:
receiving an authorization denial based upon the service provider server failing to validate the client signature based upon a revocation of a public key related to the client signature.

8. The method of claim 1, the receiving an authorization from the service provider server comprising:
receiving the authorization based upon the service provider server authorizing the lockbox signature using a licensing service lockbox public key corresponding to the licensing service lockbox private key.

9. The method of claim 1, comprising:
incorporating a timestamp into the signed session ID.

10. The method of claim 1, comprising:
requesting to the validation server to validate the client based upon installation of a software application on the client.

11. The method of claim 1, comprising:
requesting to the validation server to validate the client based upon installation of an operating system on the client.

12. The method of claim 1, the client comprising an untrusted client with respect to the validation server and the service provider server.

13. A computer readable device comprising computer executable instructions that, when executed via a processing unit, perform a method, comprising:
responsive to sending a request to validate a client to a validation server, receiving a signed genuine ticket with a public key based upon validation of the client from the validation server;
responsive to sending a request to consume data or one or more services to a service provider server, receiving a session ID from the service provider server, the service provider server different than the validation server, the client different than the service provider server and the validation server;
signing the session ID with at least one of a client signature using a private key or a lockbox signature using a licensing service lockbox private key to create a signed session ID;
sending to the service provider server an authorization response comprising the signed genuine ticket and the signed session ID; and
receiving an authorization from the service provider server based upon the service provider server authorizing the signed genuine ticket.

14. The computer readable device of claim 13, the signed genuine ticket comprising a validation server signature of the validation server.

15. The computer readable device of claim 13, the signed genuine ticket not comprising a signature of the client.

16. The computer readable device of claim 14, the validation server signature indicating that the validation server validated the client.

17. A system, comprising:
one or more processing units; and
memory comprising instructions that when executed by at least one of the one or more processing units perform operations, comprising:
maintaining a private key and a signed genuine ticket based upon validation of a client from a validation server, the signed genuine ticket comprising a validation server signature of the validation server but not a signature of the client, the validation server signature indicating that the validation server validated the client;
receiving a session ID from a service provider server;
signing the session ID with at least one of a client signature using the private key or a lockbox signature using a licensing service lockbox private key to create a signed session ID;
sending to the service provider server an authorization response comprising the signed session ID and the signed genuine ticket;
receiving an authorization from the service provider server based upon the service provider server authorizing at least one of the client signature, the lockbox signature, the signed session ID, or the signed genuine ticket;
receiving a second session ID from the service provider server;
signing the second session ID to create a signed second session ID;
sending to the service provider server a second authorization response comprising the signed second session ID and the signed genuine ticket; and
receiving a second authorization from the service provider server.

18. The system of claim 17, the operations comprising:
maintaining a fake-genuine ticket based upon a validation denial of the client from the validation server.

19. The system of claim 17, the client comprising an untrusted client with respect to the validation server and the service provider server.

20. The system of claim 17, the receiving an authorization from the service provider server comprising:
receiving an authorization denial based upon the service provider server failing to validate the client signature based upon a revocation of a public key related to the client signature.

* * * * *